No. 897,515. PATENTED SEPT. 1, 1908.
W. J. BELCHER & W. M. BUTLER.
FRICTION DRIVE CHAIN.
APPLICATION FILED MAY 25, 1908.
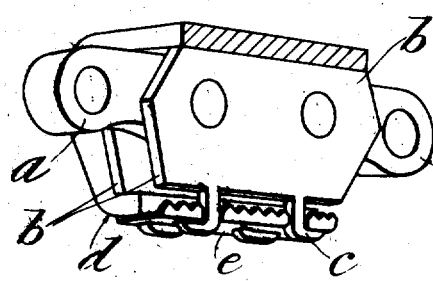
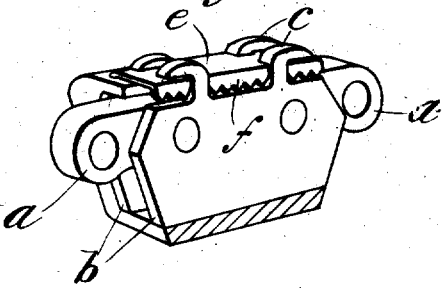
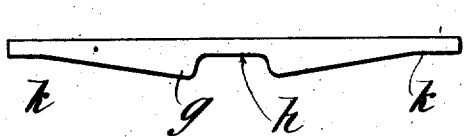
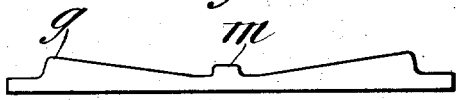
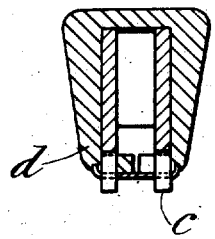
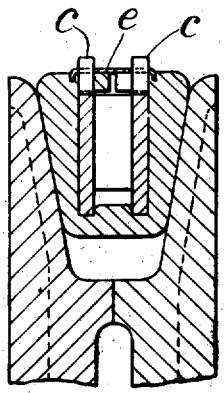
Witnesses:
H. L. Sprague
Harry W. Bown
Inventors,
Warren J. Belcher
William M. Butler
by Chapin &c.
Attorneys.

UNITED STATES PATENT OFFICE.

WARREN J. BELCHER AND WILLIAM M. BUTLER, OF HARTFORD, CONNECTICUT, ASSIGNORS TO THE WHITNEY MANUFACTURING COMPANY, OF HARTFORD, CONNECTICUT, A CORPORATION.

FRICTION DRIVE-CHAIN.

No. 897,515.   Specification of Letters Patent.   Patented Sept. 1, 1908.

Application filed May 25, 1908. Serial No. 434,917.

*To all whom it may concern:*

Be it known that we, WARREN J. BELCHER and WILLIAM M. BUTLER, citizens of the United States of America, residing at Hartford, in the county of Hartford and State of Connecticut, have invented new and useful Improvements in Friction Drive-Chains, of which the following is a specification.

This invention relates to friction drive-chains, the object of the invention being to improve the construction thereof in so far as it relates to the application to the links of a chain of a covering of some suitable material, as leather, to serve as an inclosing casing for said links, said material coming in frictional contact with the sides of a grooved pulley, and constituting the actual driving element for the latter. The driving pulley for these inextensible drive-belts of the type referred to herein has a V-shaped groove, and to provide a drive-belt which, in cross section, shall have beveled sides corresponding to the sides of the groove in the pulley, it has generally been the practice to bevel the plates which constitute one of the elements of a chain, and then apply strips of some frictional material, as leather, to these plates, the frictional material being of substantially uniform thickness.

The object of this invention is to provide a construction whereby the beveling of the sides of the drive-chain is obtained by so fashioning the strips of the frictional material that that portion thereof disposed on the two opposite sides of the belt will be so tapered in cross sectional form as to properly fit the V-groove in the pulley whereby the elements of the belt or chain which constitute the inextensible core of the structure may be made with parallel sides, which greatly facilitates and cheapens the construction of said chain.

A great advantage of a drive-chain constructed as herein set forth lies in the fact that it provides means to yieldingly cushion the sides thereof, whereby while it permits the chain to be drawn tightly into the groove in the pulley, it also permits it to leave the groove easily at the point where the chain runs out of it, owing to the fact that each piece of the frictional material, as disposed on either side of the chain, constitutes a yielding wedge, the thickness of which increases from the bottom upward. Therefore as the strain on the chain increases and it is drawn deeper into the grooved pulley the constantly increasing thickness of the cushioning covering material prevents the chain from wedging in the groove of the pulley owing to the fact that the upper portion thereof is compressible to a greater degree than the lower portion, and the effect of this is to make it much easier for the chain to leave the groove in the pulley where it runs off the latter; whereas, if the chain elements inclosed by the covering material were parallel with the sides of the groove, and said material of uniform thickness, each chain link or element would constitute a hard unyielding wedge which, under heavy strains, would have a tendency to stick in the groove of the pulley.

The invention is fully illustrated in the accompanying drawings, in which,—

Figure 1 is a perspective view of two blocks and a connecting-link of a chain, the covering of frictional material being broken away and showing the fastening device for the material on the under side of the link. Fig. 2 is a similar view to Fig. 1 but showing the fastening device for the covering of frictional material located on the upper side of the chain. Figs. 3 and 4 are side elevations of the pieces of frictional material which envelop each alternate element of the chain showing the cross sectional disposition of the material to provide the tapered side pieces thereof,—Fig. 3 showing the cross sectional form of the piece when the latter is secured on the under side, and Fig. 4 showing its shape when it is secured on the upper side thereof. Fig. 5 is a sectional elevation of the completed chain showing the fastening device on the underside, and Fig. 6 is a similar view showing the chain in its relation to the grooved pulley, the frictional material in this instance being fastened on the upper side of the chain.

Referring now to these drawings,—The chain is made up of alternate blocks $a$ and side plates or links $b$, the latter being riveted to the blocks in the usual manner. The side plates, as shown in Figs. 5 and 6, are parallel. The side plates, in the construction shown in Figs. 1 and 5, are provided on the lower edge thereof with teeth or projections $c$ integral with said plates which are adapted to extend through the opposite abutting edges of a piece of flexible, frictional material $d$, two of which strips are shown in end elevation in Figs. 3 and 4, and as they differ somewhat in cross sectional form, this difference will be referred to and explained further on. These strips, as shown in Figs. 5 and 6, particularly are adapted to encircle the chain inclosing the two oppositely located side plates *b*, as shown in the drawing, and overlapping a portion of the ends of the blocks *a* which extend between the side plates.

The mode of fastening the frictional material to the side plates forms no part of the present invention but the manner of securing the abutting ends of said material shown herein is one particularly adapted to secure said material to said side plates in a manner which will prevent the movement thereof relative to the chain, when in use.

As shown herein, the teeth or projections *c* which are shown as extending from the lower borders of the side plates in the construction shown in Figs. 1 and 5, and from the opposite borders of the side plates in the construction shown in Figs. 2 and 6, extend through metal plates *e* having down-turned serrated borders *f* which are forced into the frictional material in lines paralleling the abutting edges thereof,—the teeth *c* being bent over against the outside of the plate and clenched thereagainst.

As hereinbefore stated, the primary object of the present invention is to provide a chain of the character described, the tapering sides which bear in the grooved pulley being provided entirely by the wedge-shaped cross sectional form of the frictional material *d*, said material being cut into strips having substantially a width equal to the length of each alternate element of the chain which they are adapted to inclose. In making the strips shown in Fig. 3, a strip of friction material, as leather, (whose maximum thickness is at least equal to the thickness at *g* of the piece shown in said figure) may be run through a machine which will cut a channel *h* therein centrally of the strip, and from each border of said channel taper the sides thereof to a point near the ends or edges of the strip, as at *k*, these ends being left of substantially the same thickness as the material at the bottom of the channel *h*. When this strip is applied to the chain, the covering material will assume the cross sectional form shown in Fig. 5, that is to say, the cross sectional tapering form of the chain will be due entirely to the cross sectional form of the strip of frictional material which incloses it, the purpose and function of which construction has been previously pointed out herein.

In the construction shown in Figs. 2, 4, and 6, the sole change consists in so forming the covering strip *d* in cross section as to permit the abutting edges thereof to be secured together on the upper side of the side plates or links, instead of the under side as shown in Figs. 1 and 5; and, obviously, this requires that the taper of the sides of the covering strip or piece shall be reversed as compared with Fig. 3, otherwise, the construction is the same save for the rib *m* which, if desired may be provided centrally between the two ends and which, when the strip is in position on the link, will extend up between the lower edges of the latter thereby serving more or less to hold the covering material more securely in position.

What we claim, is:—

1. A friction-drive chain comprising pivotally connected elements, a flexible covering strip extending transversely around each alternate element, that part of said strip lying next the sides of the chain being wedge-shaped in cross section, and a fastening device to engage the abutting ends of each strip to tightly secure the covering strip to the inclosed chain element.

2. A friction-drive chain comprising pivotally connected blocks and side-plates, a covering strip extending transversely around each set of side-plates, that part of said strip lying next the sides of the chain being wedge-shaped in cross section, and a fastening device to engage the abutting ends of each strip, one edge of the side plates constituting a part of said fastening device.

3. A friction-drive chain comprising pivotally connected elements, a covering strip extending transversely around each alternate element, said strip tapering in cross sectional form from the inner towards the outer edge of the chain, and means to secure said strip in fixed position on the chain element it incloses.

WARREN J. BELCHER.
WILLIAM M. BUTLER.

Witnesses:
JAS. W. GREEN,
GEORGE L. MARSH.